United States Patent [19]

Corboy et al.

[11] Patent Number: 4,490,282

[45] Date of Patent: Dec. 25, 1984

[54] CONDUCTIVE PAINT COMPOSITION

[76] Inventors: Thomas A. Corboy, 18424 Santa Alberta, Fountain Valley, Calif. 92708; Joseph Philipson, 1485 Old House Rd., Pasadena, Calif. 91107

[21] Appl. No.: 467,958

[22] Filed: Feb. 18, 1983

[51] Int. Cl.$^3$ .................. H01B 1/04; C08R 5/07
[52] U.S. Cl. .................. 252/503; 252/510; 252/511; 106/1.12; 524/357; 524/457; 524/458
[58] Field of Search .................. 106/1.05, 1.12; 252/503, 507, 510, 513, 511; 428/336; 523/457, 458; 524/357, 440, 441

[56] References Cited

U.S. PATENT DOCUMENTS

| | | | |
|---|---|---|---|
| 3,003,975 | 10/1961 | Louis | 252/513 |
| 3,214,399 | 10/1965 | Saccomondi | 524/357 |
| 3,296,239 | 1/1967 | Karaly et al. | 524/357 |
| 3,474,464 | 10/1969 | Matthews et al. | 524/357 |
| 3,476,532 | 4/1969 | Hartaron | 524/357 |
| 4,072,516 | 2/1978 | Pepper et al. | 252/503 |
| 4,157,975 | 6/1979 | Barge et al. | 524/357 |
| 4,302,361 | 11/1981 | Kontani et al. | 252/513 |

OTHER PUBLICATIONS

The Effect of Fluorinated Substituents on Some Solution Properties of Metal Acetylacetonates, J. Inorg. Nucl. Chem., vol. 40(10), 1769-1775, 1978, Wilkins et al.

Primary Examiner—John Kight
Assistant Examiner—Garnette D. Draper
Attorney, Agent, or Firm—Christie, Parker & Hale

[57] ABSTRACT

A conductive paint composition is disclosed comprising a hardenable fluid binder, metal particles selected from the group of nickel particles, aluminum particles and mixtures thereof, carbon particles, 2,4-pentanedione and a tintinate coupling agent. Nickel particles are the preferred metal particles. Solid particles comprise from about 20% to about 80% by weight of the composition. The weight ratio of metal particles to carbon particles is preferably from about 3:1 to about 15:1.

39 Claims, No Drawings

CONDUCTIVE PAINT COMPOSITION

FIELD OF THE INVENTION

This invention relates to electrically conductive coatings and more particularly to a paint composition for providing conductive coatings having surface resistivities of less than one ohm per square at one mil thickness.

BACKGROUND OF THE INVENTION

Modern electronic systems operate in an environment containing electromagnetic emissions. Such electromagnetic emissions may be generated from man-made sources, e.g., electric motors, communications and broadcast transmitters, lighting systems and other electrical systems. Electromagnetic emissions may also be generated from natural sources, e.g., atmospheric electric disturbances and precipitation static.

Many electronic systems are, to some degree, susceptible to interference from electromagnetic emissions, and to maintain consistent and dependable results, electromagnetic interference with such systems must be prevented. In addition, the electronic systems must not emanate electromagnetic emissions beyond an acceptable limit.

Electromagnetic emissions that interfere with or radiate from electronic systems can be controlled by the application of a shielding material around the electronic system and/or around electrical subassemblies or components within the electronic system. Materials which are useful as shielding materials are those materials capable of reflecting or absorbing electromagnetic emissions. Such capability depends on, among other things, the electrical conductance of the material. Conductive materials shield better than non-conductive materials.

In the past, electrical systems were shielded from electromagnetic interference by enclosing the system in a metal enclosure. However, the cost, weight, and availability of metals plus the production costs of manufacturing such enclosures have forced the industry to turn to plastic enclosures. Plastic enclosures tend to be lightweight, dent resistant, wear resistant, low cost, readily available and easily manufactured. Plastic by itself, however, does not shield against electromagnetic interferences.

To be effective for shielding electromagnetic interferences, a plastic enclosure must either incorporate or be coated with a shielding material, i.e., a conductive material. Presently, the most common method of shielding comprises the use of plastic enclosures to which a conductive coating has been applied.

Many techniques are known for applying a conductive coating to plastics. Vacuum metalization, flame spraying techniques, and electroless plating of the plastics are methods known for depositing a metal coating onto a surface of plastic. Such techniques tend to be costly, require long production times and may result in a metal layer having poor adhesion to the plastic substrate.

A simpler and less expensive technique, which is appropriate for many applications is the application of a coating of conductive paint onto the plastic surface by conventional spray techniques, e.g., spray painting. Such a conductive paint comprises a hardenable fluid matrix and a conductive filler, e.g., metallic particles. However, there are several drawbacks associated with such conductive paints.

The most significant drawback is that coatings of conductive paints have a higher electrical resistivity than all-metal coatings. Conventional conductive paints can presently provide a surface resistivity only as low as about 2 ohms per square per mil of thickness and hence are not useful in applications requiring lower resistivities.

The resistivity of coatings of conventional conductive paints tends to increase significantly when subjected to elevated temperatures for extended periods. This further reduces the number and types of applications to which such conductive paints can be used.

Many conventional conductive paints contain relatively large conductive particles which produce coatings having rough surface finishes. For applications which require smooth finishes, e.g., a decorative exterior finish on a cabinet, such rough coatings must either be applied to another surface, e.g., the interior surface of the cabinet, which is generally more difficult or must be sanded or polished to a smooth finish.

SUMMARY OF THE INVENTION

The present invention provides a conductive paint composition comprising a hardenable fluid binder, a mixture of conductive particles including carbon particles and metal particles, a complexing agent and a coupling agent. The metal particles are selected from the group consisting of nickel particles, aluminum particles and mixtures thereof. Nickel particles are presently preferred.

The total quantity of conductive particles in the conductive paint composition is preferably maintained in the range of from about 20% to about 80% by weight. The quantity of metal particles is preferably maintained in the range of about 15% to about 70% and more preferably from about 30% to about 60% by weight of the paint composition. The quantity of carbon particles is preferably maintained in the range of from about 2% to about 20% and more preferably from about 3% to about 15% by weight of the paint composition. The weight ratio of metal particles to carbon particles is preferably from about 3:1 to about 15:1.

The metal particles preferably have an average size sufficiently small to assure that a dried thin film of the conductive paint composition has a smooth surface finish that will not require sanding or polishing prior to the application of a decorative overcoat. The average size of the carbon particles is less than the average size of the metal particles.

The complexing agent is capable of forming a stable complex with metal ions of the metal particles. The presently preferred complexing agent is 2,4-pentanedione. Presently preferred coupling agents include titanate coupling agents and silane coupling agents.

DETAILED DESCRIPTION

In accordance with the present invention, there is provided a conductive paint composition comprising a hardenable film-forming fluid binder and a mixture of conductive particles which include carbon particles and metal particles. Preferred metal particles include nickel particles and aluminum particles. The conductive paint composition further comprises a complexing agent, preferably 2,4-pentanedione and a coupling agent, preferably a titanate or a silane coupling agent.

The total amount of conductive particles in the conductive paint composition is sufficient to assure close packing of the conductive particles with resultant contact between adjacent particles. Such contact is required to provide electrically conductive pathways through a thin film or coating of the conductive paint composition. The total quantity fluid binder in the conductive paint composition is sufficient to give the composition paint-like properties, i.e., good flow and leveling characteristics, uniformity, etc., and to assure that a hardened thin film of the conductive paint composition has sufficient structural stability, e.g., does not crack or peel, for the application to which the conductive paint composition is used.

Accordingly, the total quantity of conductive particles in the paint composition is preferably maintained in the range of from about 20% to about 80% by weight and more preferably from about 35% to about 65% by weight of the total conductive paint composition. An amount of conductive particles greater than about 80% by weight generally results in a conductive paint composition having poor paint-like properties due to an insufficient amount of binder.

A conductive paint composition having less than about 20% by weight conductive particles generally results in the conductive particles being packed too loosely, i.e., spaced too far apart. This generally results in insufficient contact between particles. As less contact is made between surrounding particles, there are fewer conductive pathways through the paint composition. Those that are present are relatively circuitous, resulting in a paint composition having an undesirably higher electrical resistivity.

A total quantity of conductive particles of between about 35% by weight and about 65% by weight is presently preferred for providing the best combination of conductive particle quantity for minimizing electrical resistivity and binder quantity for providing desirable paintlike characteristics and structural stability.

The conductive particles comprises a mixture of carbon particles and metal particles, preferably selected from the group consisting of nickel particles, aluminum particles and mixtures thereof. The presently preferred metal particles are nickel particles. It has been found that such a mixture results in a conductive paint composition having a lower electrical resistivity than a conductive paint composition comprising only metal particles.

It has also been found that the electrical resistance of the paint composition is minimized when the weight ratio of metal particles to carbon particles in the mixture is from about 2:1 to about 20:1 and particularly from about 3:1 to about 15:1.

It is presently preferred that the total amount of metal particles in the paint composition be from about 15% to about 70% by weight, and more preferably from about 30% to about 60% by weight of the total conductive paint composition. Quantities of metal particles greater than about 70% by weight are not preferred because, when combined with the carbon particles, an insufficient amount of binder is present in the paint composition. A quantity of metal particles less than about 15% by weight generally results in undesirably high resistivity.

The amount of carbon particles is preferably maintained in the range of from about 2% to about 20% by weight and more preferably from about 3% to about 15% by weight of the total conductive paint composition. It has been found that quantities within the range of from about 2% to about 20% and particularly in the range of from about 3% to about 15% tend to minimize the resistivity of the paint composition.

The size of the metal particles can vary within a broad range but is preferably sufficiently small to enable the conductive paint composition to dry to a smooth surface finish, i.e., a surface requiring no sanding or polishing prior to the application of a decorative overcoat, when the conductive paint composition is applied as a thin coating, e.g., 5 mils or less.

Numerical values for the preferred particle sizes vary according to the shape of the particles and according to the method of measurement. Metal particles, which have a mean particle size suitable for this invention include nickel particles marketed by Alcan Ingot and Powders of Elizabeth, N.J., under the trade name INCO No. 287. These particles have irregular shapes and form chain-like structures. According to the literature supplied by Alcan Ingot and Powers, the average particle size of the the INCO No. 287 nickel particles is from about 2.6 microns to about 3.3 microns as measured indirectly by a Fisher Subsieve Sizer or a mean particle size of about 17 microns as measured by a Microtrac TM Particle-Size Analyzer manufactured by Leeds and Northrop Company. Other metal particles suitable for this invention include nickel particles marketed by Novemet Corporation under the trade name Novemet Nickel PO.

As used herein, "mean metal particle size" or "mean size of the metal particles" refers to the weight mean diameter of the metal particles, as measured by a Microtac Particle-Size Analyzer and means that about 50% of the particles have a particle size under the mean size and about 50% have a particle size over the mean. For INCO No. 287, about 80% of the nickel particles are within the range of from about 4.2 to about 51.4 microns.

It is preferred that the mean particle size of the metal particles be from about 5 microns to about 50 microns, and more preferably from about 10 microns to about 30 microns.

Conductive paint compositions comprising metal particles having a mean particle size less than about 5 microns tend to have undesirably high electrical resistivities. It is believed that this results because, as the mean size of the metal particles become smaller, more particles are required to complete electrically conductive pathways through the paint composition. The electrical resistance through metal particles is less than the electrical resistance between contacting particles because of the presence of nonconductive or less conductive surface films, and hence, the resistivity of the paint composition generally increases with an increase in the number of metal particles in the electrical pathways.

Metal particles having a mean size greater than about 50 microns are also not preferred. This is because particles having a mean size greater than 50 microns result in a rough surface finish when the paint composition is applied as a thin film to an otherwise smooth surface.

A mean conductive particle size of from about 10 microns to about 30 microns is most preferred because such a mean particle size provides the paint composition with most desirable combination of low electrical resistance and consistently smooth surface finishes when applied as a thin film.

The size of the carbon particles is also not critical as long as the mean size of the carbon particles are less than that of the metal particles. It has been found that the electrical resistivity of the paint composition is minimized when such a relationship exists. It is believed that the carbon particles fill at least a portion of the the interstices between the metal particles, thereby increasing the number of electrical pathways between the metal particles.

Preferred carbon particles have a mean size or mean Stokes diameter of from about 15 millimicrons to about 45 millimicrons, and more preferably from about 25 millimicrons to about 35 millimicrons. It has been found that when the carbon particles have a mean size within the range of about 15 millimicrons to about 45 millimicrons and particularly within the range of about 25 millimicrons to about 35 millimicrons, the electrical resistance of the conductive paint composition is minimized.

As used herein "mean carbon particle size" or "mean size of the carbon particles" is the Stokes diameter measured by a sedimentation process and means that about 50% of the carbon particles have a Stokes diameter greater than the mean size and 50% of the carbon particles have a Stokes diameter less than the mean size.

Carbon particles suitable for this invention are manufactured by Cabot Corporation of Edison, N.J. under the trade name Vulcan XC-72R. According to the manufacturer, the Vulcan XC-72R carbon particles have a mean particle size, measured as a Stokes diameter, of about 30 millimicrons with about 80% of the particles falling within the range of from about 8 millimicrons to about 60 millimicrons.

The conductive paint composition further comprises a complexing agent which is capable of forming a complex with metal ions of the metal particles. The complexing agent 2,4-pentanedione is presently preferred. Addition of the complexing agent to the conductive paint composition results in a lower electrical resistivity of the conductive paint composition. That is, a coating of a conductive paint composition comprising such a complexing agent has a lower resistivity than a coating of an otherwise similar conductive paint composition without the complexing agent.

The mechanism by which the complexing agent reduces or minimizes the resistivity of the conductive paint composition is not clearly understood. It is believed that the complexing agent forms complexes with the metal ions of non-conductive or less conductive surface films, such as metal oxides thereby establishing a clean, e.g., non-oxidized, metal surface on the particles. Such action would enhance electrical contact between contacting metal particles and result in a lower electrical resistance between the contacting metal particles.

The amount of complexing agent in the conductive paint composition depends on the physical properties, e.g., solubility, reactivity, etc., of the complexing agent. 2,4-pentanedione is preferably maintained at a level below about 7% by weight of the conductive paint composition and preferably between about 0.1% and 2% by weight. About 7% by weight of 2,4-pentanedione is a practical limit due to the corrosive nature of 2,4-pentanedione. Conductive paint compositions, as with most paints, are generally stored in metal containers. Compositions having less than about 7% by weight 2,4-pentanedione tend not to be corrosive to metal containers. However, conductive paint compositions having more than about 7% by weight 2,4-pentanedione tend to cause corrosion of the containers resulting in leakage or spillage of the conductive paint composition. In addition, no added benefit has been found when the concentration of 2,4-pentanedione is increased to a concentration greater than about 7% by weight.

A concentration of 2,4-pentanedione in the range of from about 0.1% to about 2% by weight is presently preferred, as a concentration in this range tends to minimize the resistivity of the conductive paint composition. No significant benefit has been seen by increasing the concentration above about 2% by weight of the paint composition.

In addition to decreasing the resistivity of the conductive paint composition, 2,4-pentanedione is preferred because it acts as a drying agent when the paint composition is applied as a thin film.

The conductive paint composition also comprises at least one coupling agent. Presently preferred coupling agents include titanate coupling agents and silane coupling agents. Such coupling agents are used for improving the bond between the metal surface and polymer matrix. The coupling agents provide uniform distribution of the conductive particles and enhance the flow characteristics, i.e., reduce the viscosity, of the conductive paint composition.

Titanate coupling agents and silane coupling agents are the presently preferred coupling agents because it has been found that coatings of conductive paint compositions incorporating such coupling agents have a lower electrical resistivity than coatings of otherwise similar conductive paint composition without such coupling agents.

The specific coupling agent most appropriate for the conductive paint composition depends on the type of binder that is being used. Such coupling agents are well known and the most appropriate coupling agent for a particular binder can be easily ascertained from manufacturers' catalogs, bulletins and the like, such as "Ken-React: Titanate Coupling Agents For Filled Polymers" published in September 1976 by Kenrich Petrochemicals, Inc.

The hardenable fluid binder can be any fluid matrix which can be applied in a liquid state and which, once applied, hardens to a solid form. The mechanism for hardening may vary. For example, some binder materials may be dissolved in a solvent which evaporates after application to generate a solid coating. Other binder materials harden as a result of a polymerization reaction. Suitable binder materials include acrylics, epoxies, polyethylenes and ethylene copolymers, polyesters, polycarbonates, polyamides, polystyrenes, polypropylenes, polybutylenes, polyurethanes, phenolics, and the like.

The conductive paint composition can be stored as a single mixture or as separate components which must be combined prior to application. Multiple component formulations are generally used when the binder is one that hardens as a result of a polymerization reaction between two or more components of the formulation. For example, polyurethanes are generally stored as at least a two component formulation. One component contains a diisocyanate and the other contains an active hydrogen such as a phenol, amine, hydroxylic or carboxylic compound which reacts with the diisocyanate to form a hard polymer. In multiple component formulations, the conductive particles, complexing agent and coupling agent may be all combined in one component or contained in different components.

In the practice of the invention, the metal particles and carbon particles are mixed with the fluid binder or at least one component of the fluid binder sufficiently to uniformly distribute the particulates. It has been found that mixing in a high shear mixer, such as 3-roll mill, a ball mill, a sand mill, or the like, for providing a grind of no more than 4+ as measured on a Hedgeman grind gage provides satisfactory particle distribution.

The present invention offers several unique and unexpected advantages over conventional conductive paint compositions. The most significant advantage is that of lower electrical resistivity. For example, it has been found that a thin film of a conductive paint composition containing nickel particles, carbon particles, a complexing agent and a coupling agent in accordance with this invention having a thickness of one mil has a surface resistivity as low as 0.4 ohms per square. The minimum surface resistivity of a one mil thin film of an otherwise similar conductive paint composition, i.e., containing only nickel particles, and no carbon particles, complexing agent or coupling agent, has been found to be about 2 ohms per square. This enables a conductive paint composition made in accordance with the invention to be used for applications not previously appropriate for conductive paints.

The lower electrical resistivity of the conductive paint compositions of this invention also enables the use of less material, i.e., the application of thinner films, than conventional conductive paints for a particular application. This provides economic savings to the user of the conductive paint composition.

Another advantage of the present invention is that coatings having low electrical resistances are obtained using conductive particles of very small size. This enables the coatings to have a very smooth surface finish. Such a smooth finish enables the conductive paint composition to be applied to exterior surfaces of electrical system cabinets and housings. Since exterior surfaces generally have fewer contours, such surfaces are easier to paint. In addition, no sanding is required prior to the application of decorative overcoats. This generates savings in labor and materials.

An additional and very significant advantage of the present invention is that a coating of a conductive paint composition made in accordance with the present invention has excellent heat stability, i.e., the surface resistivity, increases significantly less as a result of prolonged exposure to elevated temperature than the surface resistivity of a thin film of an otherwise similar paint composition containing only nickel particles. This again allows the use of paint compositions made in accordance with this invention for applications previously inappropriate for conductive paints.

EXAMPLE 1

A conductive paint composition was made according to the following formulation:

|  | Pounds | Gallons |
|---|---|---|
| Amberlac 13-802[1] | 112.04 | 13.73 |
| Cellosolve Acetate | 510.75 | 63.06 |
| Methyl Ethyl Ketone | 268.10 | 69.66 |
| VAGD[2] | 64.15 | 5.54 |
| INCO No. 287 Nickel[3] | 813.56 | 10.96 |
| Vulcan XC-72R Carbon Black[4] | 54.00 | 3.60 |
| Mondur CB-75[5] | 358.48 | 37.31 |
| 2,4-Pentanedione | 17.41 | 2.14 |
| Tyzor ANF[6] | 132.67 | 16.12 |
| Isopropyl Alcohol | 569.03 | 86.88 |

[1]Amberlac 13-802 is the trade name for a mixture of acrylic alkyd (50%) dissolved in cellosolve acetate manufactured by Rohm and Haas Co., Los Angeles, CA.
[2]VAGD is the trade name for vinyl chloride-vinyl acetate copolymer manufactured by Union Carbide Corporation, Long Beach, CA.
[3]INCO No. 287 Nickel is the trade name of nickel particles having an average particle size of 35 millimicrons manufactured by Alcan Ingot, Elizabeth, NJ.
[4]Vulcan XC-72R Carbon Black is the trade name for carbon particles having an average size of 30 millimicrons by Cabor Corporation, Edison, NJ.
[5]Mondur CB-75 is the trade name for a polyisocyanate adduct manufactured by Mobay Chemical Co., Pittsburg, PA.
[6]Tyson ANF is the trade name of a titanium acetal acetonate coupling agent manufactured by E. I. Dupont de Nemours and Co., Inc., Wilmington, DE.

The mixture was sprayed onto a 2 inch square 5 mil thick Mylar[7] panel to a thickness of about 1 mil. The coated panel was dried in air for about 15 minutes at 190° F. [7] Mylar is the trade name for a polyester film manufactured by E. I. Dupont de Nemours and Co., Inc., Wilmington, Del.

The surface resistivity was then tested over a 1 inch square using a conductive bridge mounted on a spring loaded fixture. The surface resistivity was 0.4 ohms per square.

EXAMPLE 2

A test panel coated and dried by the procedure described in Example 1 was baked in an oven for 24 hours at 150° F. The surface resistivity was measured before and after baking. Before baking, the surface resistivity was 0.6 ohms per square. After baking, the surface resistivity was measured at 0.8 ohms per square.

EXAMPLE 3

A conductive paint composition was made according to the formulation of Example 1 with the exceptions that carbon particles, 2,4-pentanedione and the coupling agent were omitted.

The resulting mixture was sprayed onto a 2 inch square, 5 mil thick Mylar panel to a film thickness of about one mil. The coated panel was dried at 190° F. for about 15 minutes.

The surface resistivity was then tested over a one inch square using a conductive bridge mounted on a spring loaded fixture. The surface resistivity was 2 ohms per square.

EXAMPLE 4

The coated panel of Example 3 was heated for 24 hours at 150° F. The surface resistivity was then measured as in Example 3 and was found to be about 30 ohms per square.

What is claimed is:

1. A conductive paint composition comprising a hardenable fluid binder, a mixture of conductive particles in an amount of from about 20% to about 80% by weight of the conductive paint composition, said mixture comprising carbon particles and metal particles selected from a group of nickel particles, aluminum particles and mixtures thereof 1,4-pentanedione in an amount of the about 7% by weight of the conductive paint composition and a coupling agent in an amount up to about 2% by weight of the conductive paint composition.

2. A conductive paint composition as claimed in claim 1 wherein the metal particles are nickel particles.

3. A conductive paint composition as claimed in claim 1 wherein the coupling agent is selected from the group consisting of titanate coupling agents and silane coupling agents.

4. A conductive paint composition as claimed in claim 1 wherein the average size of the carbon particles is less than the average size of the metal particles.

5. A conductive paint composition as claimed in claim 4 wherein the mean size of the metal particles is at least about 5 micron.

6. A conductive paint composition as claimed in claim 4 wherein the mean size of the carbon particles is at least about 15 millimicrons.

7. A conductive paint composition comprising a hardenable fluid binder, nickel particles, carbon particles, 2,4-pentanedione and a coupling agent.

8. A conductive paint composition as claimed in claim 7 wherein the amount of nickel in the composition is from about 15% by weight to about 70% by weight of the conductive paint composition.

9. A conductive paint composition as claimed in claim 7 wherein the amount of carbon present in the composition is from about 2% by weight to about 20% by weight of the conductive paint composition.

10. A conductive paint composition as claimed in claim 7 wherein the average size of the carbon particles is less than the average size of the nickel particles.

11. A conductive paint composition as claimed in claim 10 wherein the mean size of the nickel particles is from about 5 microns to about 50 microns.

12. A conductive paint composition as claimed in claim 10 wherein the mean size of the carbon particles is from about 15 millimicrons to about 45 millimicrons.

13. A conductive paint composition as claimed in claim 7 wherein the amount of 2,4-pentanedione is no more than about 7% by weight of the conductive paint composition.

14. A conductive paint composition as claimed in claim 7 wherein the amount of coupling agent is less than about 2% by weight of the conductive paint composition.

15. A conductive paint composition comprising a hardenable fluid binder, nickel particles, carbon particles, 2,4-pentanedione, and at least one coupling agent selected from the group consisting of titanate coupling agents, silane coupling agents and mixtures thereof, and wherein the weight ratio of nickel particles to carbon particles is from about 3:1 to about 15:1.

16. conductive paint composition as claimed in claim 15 wherein the nickel particles have a mean size of from about 5 microns to about 50 microns.

17. A conductive paint composition as claimed in claim 15 wherein the carbon particles have a mean size of from about 15 millimicrons to about 45 millimicrons.

18. A conductive paint composition as claimed in claim 15 wherein the amount of nickel is from about 20% by weight to about 70% by weight of the conductive paint composition.

19. A conductive paint composition as claimed in claim 15 wherein the amount of carbon is from about 2% by weight to about 20% by weight of the conductive paint composition.

20. A conductive paint composition comprising:
a hardenable fluid binder;
nickel particles in an amount of from about 15% by weight to about 70% by weight of the conductive paint composition;
carbon particles in an amount of from about 2% by weight to about 20% by weight of the conductive paint composition;
2,4-pentanedione in an amount no more than about 7% by weight of the conductive paint composition;
a coupling agent selected from the group consisting of titanate coupling agents, silane coupling agents and mixtures thereof in an amount no more than about 2% by weight of the conductive paint composition.

21. A conductive paint composition as claimed in claim 20 wherein the amount of nickel particles is from about 30% by weight to about 60% by weight of the conductive paint composition.

22. A conductive paint composition as claimed in claim 20 wherein the amount of carbon particles is from about 3% by weight to about 15% by weight of the conductive paint composition.

23. A conductive paint composition as claimed in claim 20 wherein the weight ratio of nickel particles to carbon particles is from about 3:1 to about 15:1.

24. A conductive paint composition as claimed in claim 20 wherein the nickel particles generally have a mean size of from about 5 microns to about 50 microns.

25. A conductive paint composition as claimed in claim 20 wherein the carbon particles generally have a mean size of from about 15 millimicrons to about 45 millimicrons.

26. A conductive paint composition as claimed in claim 20 wherein the amount of 2,4-pentanedione is from 0.1% to about 2% by weight of the conductive paint composition.

27. A conductive paint composition comprising:
a hardenable fluid binder;
nickel particles having a mean size of from about 5 microns to about 50 microns in an amount of from about 15% by weight to about 70% by weight of the conductive paint composition;
carbon particles having a mean size of from about 15 millimicrons to about 45 millimicrons in an amount of from about 2% by weight to about 20% by weight of the conductive paint composition;
2,4-pentanedione in an amount from about 0.1% to about 2% by weight of the conductive paint composition; and
at least one coupling agent in an amount of less than about 2% by weight of the conductive paint composition.

28. A conductive paint composition as claimed in claim 27 wherein the weight ratio of nickel particles to carbon particles is from about 3:1 to about 15:1.

29. A conductive paint composition as claimed in claim 27 wherein the amount of nickel particles is from about 30% by weight to about 60% by weight of the conductive paint composition.

30. A conductive paint composition as claimed in claim 27 wherein the amount of carbon particles is from about 3% by weight to about 15% by weight of the conductive paint composition.

31. A conductive paint composition as claimed in claim 27 wherein the nickel particles have a mean size of from about 10 microns to about 30 microns.

32. A conductive paint composition as claimed in claim 27 wherein the carbon particles have a mean size of from about 25 millimicrons to about 35 millimicrons.

33. A conductive coating comprising:
a solid non-conductive matrix;
metal particles selected from the group consisting of nickel particles, aluminum particles and mixtures thereof in an amount of from about 15% by weight to about 70% by weight of the conductive coating;

carbon particles in an amount of from about 2% by weight to about 20% by weight of the conductive coating;

2,4-pentanedione in an amount of up to about 7% by weight of the conductive coating; and at least one coupling agent in an amount of less than about 2% by weight of the conductive coating.

34. A conductive coating as claimed in claim 33 wherein the metal particles are nickel particles.

35. A conductive coating as claimed in claim 33 wherein the amount of nickel particles is from about 30% by weight to about 60% by weight of the conductive coating.

36. A conductive coating as claimed in claim 33 wherein the amount of carbon particles is from about 3% by weight to about 15% by weight of the conductive coating.

37. A conductive coating as claimed in claim 33 wherein the nickel particles have a mean size of from about 5 microns to about 50 microns.

38. A conductive coating as claimed in claim 33 wherein the carbon particles have a mean size of from about 15 millimicrons to about 45 millimicrons.

39. A conductive coating as claimed in claim 34 wherein the weight ratio of nickel particles to carbon particles is from about 3:1 to about 15:1.

* * * * *